United States Patent
Sudo

(10) Patent No.: US 6,839,335 B1
(45) Date of Patent: Jan. 4, 2005

(54) RADIO COMMUNICATION APPARATUS AND RADIO COMMUNICATION METHOD

(75) Inventor: Hiroaki Sudo, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 826 days.

(21) Appl. No.: 09/605,862

(22) Filed: Jun. 29, 2000

(30) Foreign Application Priority Data

Jul. 2, 1999 (JP) ....................................... H11-189520

(51) Int. Cl.[7] ............................................... H04J 1/00
(52) U.S. Cl. ..................... 370/335; 370/342; 370/343; 455/452.2; 455/69; 455/101; 455/102; 455/103; 455/132
(58) Field of Search ................................ 370/304, 306, 370/309, 329, 335, 342, 332; 455/452.2, 69, 67.13, 101–104, 132–138

(56) References Cited

U.S. PATENT DOCUMENTS

| | | | |
|---|---|---|---|
| 5,598,404 A | * 1/1997 | Hayashi et al. | 370/342 |
| 5,781,592 A | 7/1998 | Masuda | |
| 5,896,425 A | * 4/1999 | Hirano et al. | 375/354 |
| 6,005,876 A | * 12/1999 | Cimini et al. | 370/525 |
| 6,006,113 A | * 12/1999 | Meredith | 455/561 |
| 6,009,307 A | * 12/1999 | Granata et al. | 455/13.3 |
| 6,144,711 A | * 11/2000 | Raleigh et al. | 375/347 |
| 6,188,717 B1 | * 2/2001 | Kaiser et al. | 375/148 |
| 6,327,314 B1 | * 12/2001 | Cimini, Jr. et al. | 375/340 |
| 6,574,461 B1 | * 6/2003 | Skold | 455/277.2 |
| 6,600,776 B1 | * 7/2003 | Alamouti et al. | 375/147 |

FOREIGN PATENT DOCUMENTS

CN 1132012 A 9/1996

OTHER PUBLICATIONS

European Search Report dated Jul. 28, 2003.
I. Jeong, et al., "Multi–carrier CDMA system using multi–antenna for indoor wireless communication", Telecommunications Symposium, 1998, ITS '98 Proceedings, SBT/IEEE International Sao Paulo, Brazil, Aug. 9–13, 1998, New York, NY, USA, IEEE, US, Aug. 9, 1998, pp. 83–88, XP010300785, ISBN: 0–7803–5030–8.
H. Takahashi, et al., "Antenna and Multi–Carrier Combined Diversity System", IEICE Transactions on Communications, vol. E79–B, No. 9, Sep. 1996, pp. 1221–1226, XP002245704.
H. Matsutani et al., "Multi–Carrier DS–CDMA using Frequency Spread Coding," Technical Report of IEICE, RCS98–159 (Nov. 1998), pp. 49–54.

* cited by examiner

*Primary Examiner*—Steven Nguyen
*Assistant Examiner*—Roberta Stevens
(74) *Attorney, Agent, or Firm*—Stevens, Davis, Miller & Mosher, LLP

(57) ABSTRACT

Diversity control section 111 calculates received amplitude levels of all subcarrier signals from all branches, and selects a branch providing the largest amplitude level for each subcarrier signal. Based on the above selection result, selectors 104 are switched to transmit respective subcarrier signals from the selected branch, and selectors 112 are switched to receive respective subcarrier signals from the selected branch.

7 Claims, 10 Drawing Sheets

RADIO COMMUNICATION APPARATUS AND RADIO COMMUNICATION METHOD

BACKGROUND OF THE INVENTION

1. Field of the Invention

The present invention relates to a transmission/reception apparatus, and more particularly, to a transmission/reception apparatus that assigns a spread transmission signal for a subcarrier for each spread signal to perform frequency division multiplexing in a mobile communication, and thereby performs radio communications in a combination system of OFDM/TDD and CDMA, and a transmission diversity method for such an apparatus.

2. Description of the Related Art

In a CDMA communication, interference between spreading codes takes place in multipath environment, and an error rate characteristic deteriorates. Meanwhile, as a communication system resistant to the interference between spreading codes, there is known an OFDM communication using guard intervals. Therefore as a next generation system, attention is drawn to an OFDM-CDMA system radio communication which provides multicarrier in the CDMA communication, assigns a subcarrier signal for each chip, and thereby performs frequency division multiplexing to transmit signals.

In the OFDM-CDMA communication, a plurality of signals are spread with different non-correlative spreading codes, and one spread signal is assigned one subcarrier. When the spreading codes are completely orthogonal, it is possible to completely remove signals except required signals by despreading processing in receiving the signals even if the signals are multiplexed greatly.

The following explains a conventional OFDM-CDMA transmission/reception apparatus using FIGS. 1 and 2. FIG. 1 is a block diagram illustrating a schematic configuration of the conventional transmission/reception apparatus, and FIG. 2 is a schematic diagram illustrating one example of subcarrier assignments in a conventional OFDM-CDMA communication.

In a transmission system in FIG. 1, spreading section 1 multiplies transmission signals 1 to n respectively by spreading codes 1 to n to perform spreading processing. Herein a spreading factor is assumed to be k.

Addition section 2 adds spread transmission signals, and Serial-Parallel; S/P converter 3 converts single-sequence signals into plural-sequence signals. Herein added spread transmission signals are divided for each spread signal, and spread transmission signals 1 to n are disassembled into the first to kth chips for each spread signal (chip).

IFFT processing section 4 performs Inverse Fourier Transform processing on the plural-sequence signals, and at this point, assigns one subcarrier for one chip data signal sequence to process frequency division multiplexing.

That is, the number of subcarriers matches with the spreading factor, and herein is k. In addition, it is assumed that subcarrier 1 is assigned for first chips of transmission signals 1 to n, and subcarrier k is assigned for kth chips of transmission signals 1 to n. In other words, chip data sequences are subjected to the frequency division multiplexing. FIG. 2 illustrates this aspect. Antenna 5 performs transmission and reception of radio signals.

In a reception system, FFT processing section 6 performs Fourier. Transform processing on a received signal to obtain each subcarrier signal (chip data signal sequence). Compensation sections 7 are provided for each subcarrier, and perform compensation processing such as phase compensation on respective subcarrier received signals.

Parallel-Serial; P/S converter 8 converts the plural-sequence signals into the single-sequence signals, specifically rearranges each subcarrier signal for one chip, outputs at time t1 the first chip of a signal obtained by multiplexing spread transmitted signals 1 to n, outputs at time t2 the second chip of the signal obtained by multiplexing spread transmitted signals 1 to n, and then sequentially outputs at time tk the kth chip of the signal obtained by multiplexing spread transmitted signals 1 to n.

Despreading section 9 multiplies received signals, each of which is converted into the single-sequence signal, by respective spreading codes 1 to n, and obtains only signals spread with the codes to perform despreading.

However the conventional transmission/reception apparatus has the following problem. That is, in the multipath environment, each subcarrier signal is affected by fading variation independently, causing a case that received amplitudes are different between subcarrier signals as illustrated in FIG. 3.

In the OFDM-CDMA communication, since one subcarrier is assigned for each chip assignment position of each spread transmission signal, i.e., one subcarrier is assigned for one chip, to perform the frequency division multiplexing, a deviation in received amplitude of each subcarrier signal directly becomes a deviation in received amplitude of the spread signal, and as a result, the orthogonality deteriorates.

That is, spreading codes are selected so that each spreading code is orthogonalized to each other. However there is the assumption that amplitudes of the spreading codes are constant, and therefore the orthogonality deteriorates when divinations are generated in received amplitudes of spreading codes.

For example, the correlation of spread signal sequence RX [1, −1, 1, 1] with spreading code sequence TX [−1, −1, 1, −1] is as follows:

$$RX \cdot TX = [1, -1, 1, 1] \cdot [-1, -1, 1, -1] = 1 \times (-1) + (-1) \times (-1) + 1 \times 1 + 1 \times (-1) = 0$$

where the orthogonality is confirmed.
Herein assume that amplitude divination is generated in spreading code sequence RX, and that RX becomes RX'[3, −0.1, 0.2, 1]. In this case, the correlation is as follows:

$$RX' \cdot TX = [3, -0.1, 0.2, 1] \cdot [-1, -1, 1, -1] = 3 \times (-1) + (-0.1) \times (-1) + 0.2 \times 1 \times (-1) = -3.7$$

where the orthogonality deteriorates.

Thus in the multipath environment, when the orthogonality between spreading codes deteriorates, other signal components remain as noise components corresponding to deterioration of the orthogonality, and thereby the error rate characteristic deteriorates. Since the noise components are increased as the number of multiplexed signals is increased, the deterioration of the error rate characteristic is proportional to the number of multiplexed signals, and as a result, the extent of deterioration is increased as the number of multiplexed signals is increased.

Generally in the radio communication system, since the error rate is controlled to be below a predetermined level, the number of signals to be multiplexed is decreased to prevent the deterioration of the error rate characteristic, and thereby the transmission capacity is decreased.

SUMMARY OF THE INVENTION

It is an object of the present invention to provide a transmission/reception apparatus that decreases an amplitude difference between subcarrier signals to maintain the orthogonality between spreading codes, and thereby enables improved transmission efficiency in the multipath environment.

It is a subject of the present invention to select a branch providing the largest received amplitude for each subcarrier at the time of reception, and transmit only subcarrier signals selected for each branch at the time of transmission.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Embodiments of the present invention will be described below with reference to accompanying drawings.

(First Embodiment)

A transmission/reception apparatus according to this embodiment selects a branch providing the largest received amplitude for each subcarrier at the time of reception, and transmits only subcarrier signals selected for each branch at the time of transmission.

Figure 1:
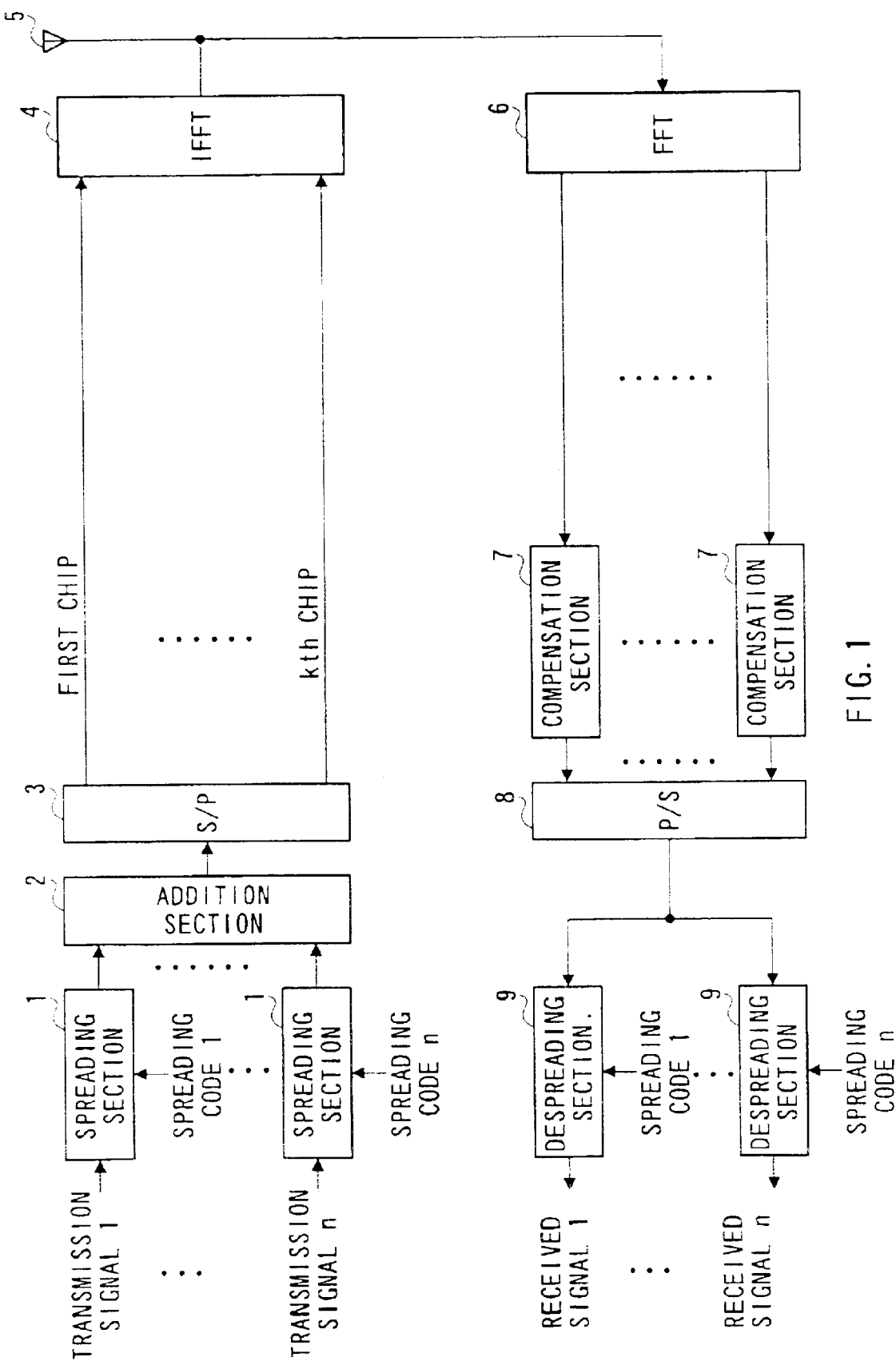
FIG. 1 is a block diagram illustrating a schematic configuration of a conventional transmission/reception apparatus.
Figure 2:
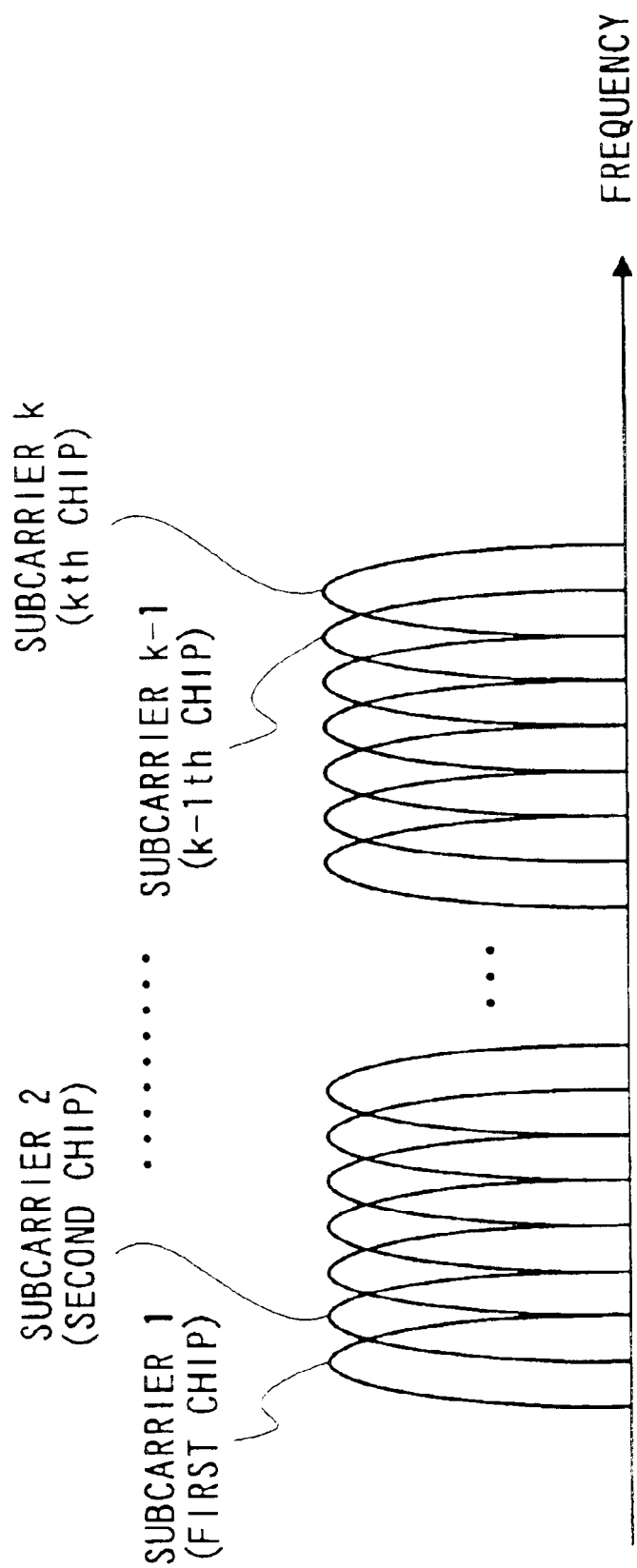
FIG. 2 is a schematic diagram illustrating one example of subcarrier assignments in a conventional OFDM-CDMA communication.
Figure 3:
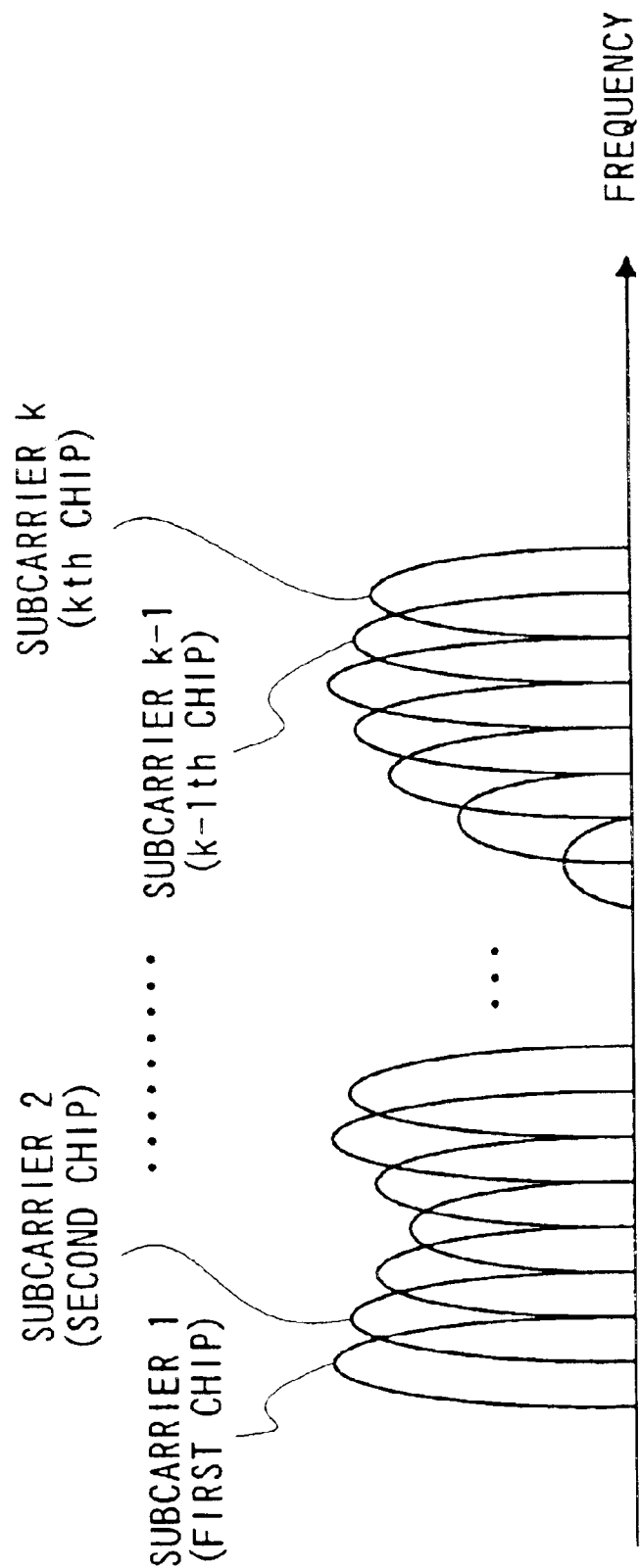
FIG. 3 is a schematic diagram illustrating another example of subcarrier assignments in a conventional OFDM-CDMA communication.
Figure 4:
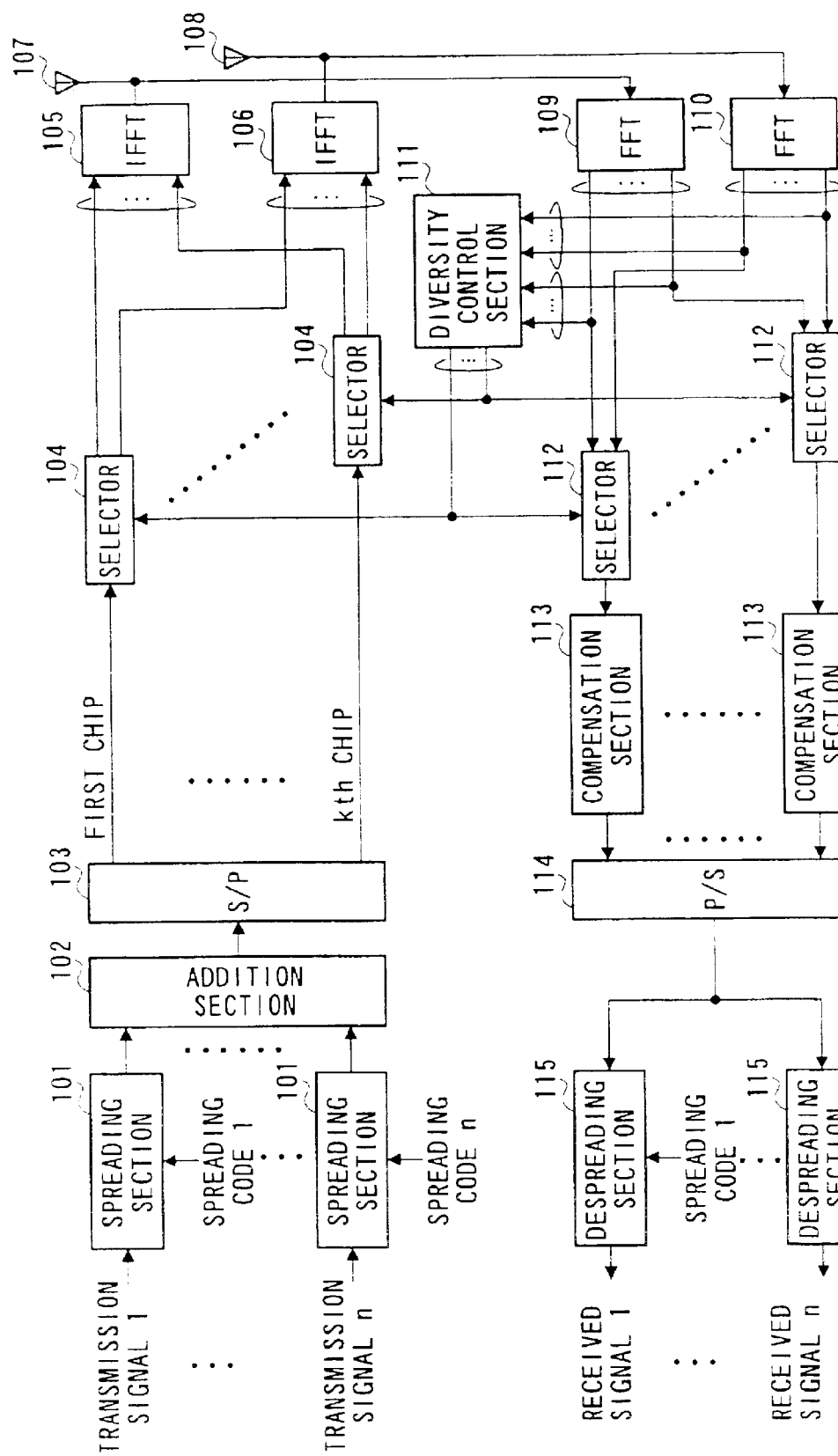
FIG. 4 is a block diagram illustrating a schematic configuration of a transmission/reception apparatus according to a first embodiment of the present invention.
Figure 5:
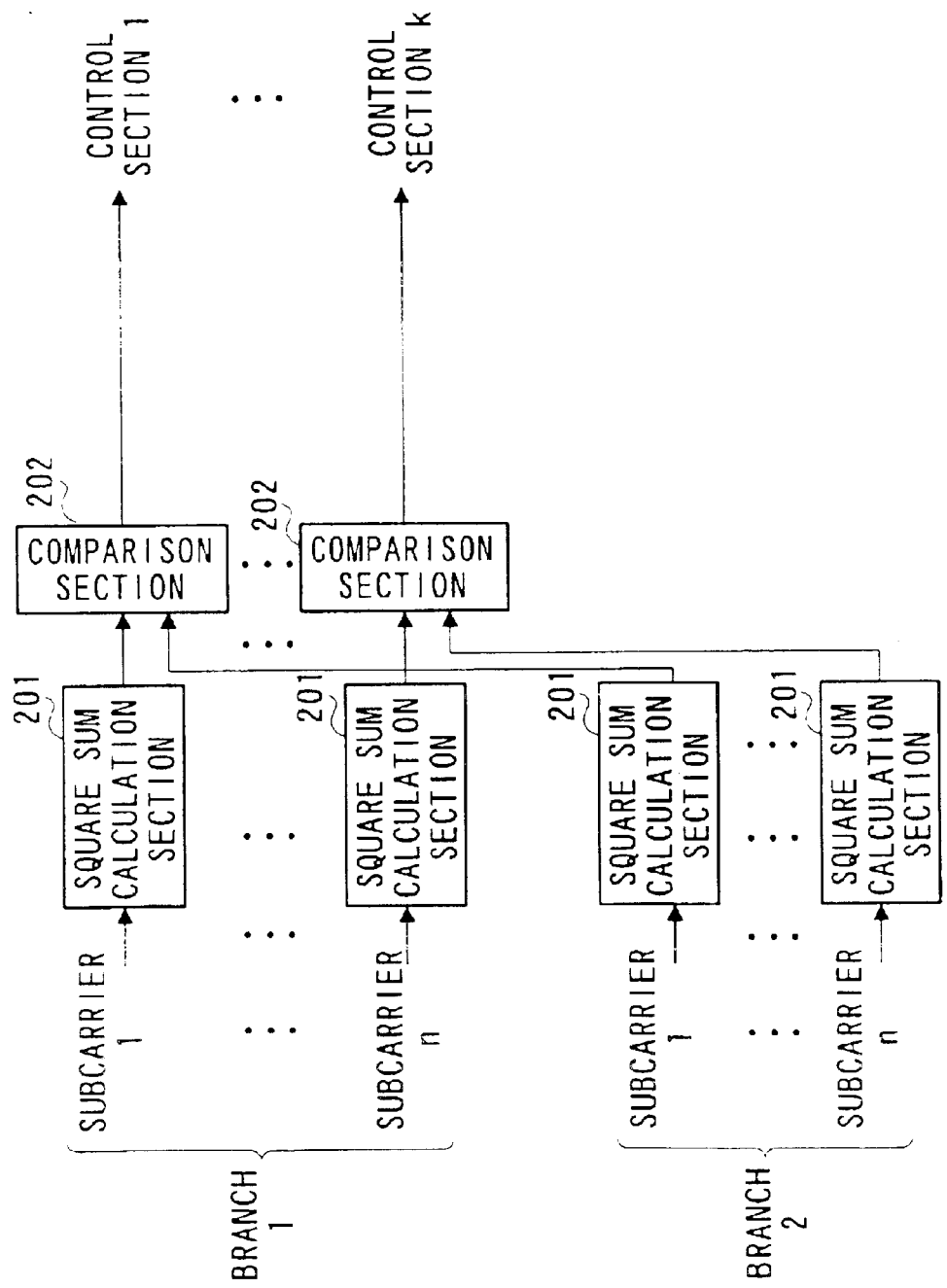
FIG. 5 is a block diagram illustrating a schematic configuration of a diversity control section in the transmission/reception apparatus according to the first embodiment of the present invention.

The transmission/reception apparatus according to this embodiment is explained below using FIGS. 4 to 6. FIG. 4 is a block diagram illustrating a schematic configuration of the transmission/reception apparatus according to the first embodiment of the present invention, FIG. 5 is a block diagram illustrating a schematic configuration of a diversity control section in the transmission/reception apparatus according to the first embodiment of the present invention, and FIG. 6 is a schematic diagram illustrating one example of subcarrier assignments of transmission signals and received signals according to the first embodiment of the present invention. In addition, it is assumed herein that the number of branches is 2.

In a transmission system in FIG. 4, spreading section 101 multiplies transmission signals 1 to n respectively by spreading codes 1 to n to perform spreading processing. Herein a spreading factor is assumed to be k. Addition section 102 adds spread transmission signals, and S/P conversion section 103 divides added spread transmission signals for each spread signal, and disassembles spread transmission signals 1 to n, for each spread signal, i.e., into the first to kth chips.

Selectors 104 are provided for each subcarrier, and switched using as switching control an instruction from diversity control section 111 described later to output an input spread signal to either of IFFT processing section 105 for branch 1 described later or IFFT processing section 106 for branch 2 described later.

IFFT processing section 105 is the IFFT processing section for branch 1, and assigns one subcarrier for one chip data signal sequence to process the frequency division multiplexing. Similarly IFFT processing section 106 is the IFFT processing section for branch 2, and assigns one subcarrier for one chip data signal sequence to process the frequency division multiplexing.

Antenna 107 performs transmission and reception of radio signals for branch 1, and antenna 108 performs transmission and reception of radio signals for branch 2.

Meanwhile in a reception system, FFT processing section 109 is the FFT processing section for branch 1, and performs Fourier Transform processing on a received signal to obtain each subcarrier signal (chip data signal sequence). Similarly FFT processing section 109 is the FFT processing section for branch 2, and performs Fourier Transform processing on a received signal to obtain each subcarrier signal (chip data signal sequence).

Diversity control section 111 detects a received amplitude for each subcarrier in each branch, and selects a branch providing the largest received level for each subcarrier. The selection result is output, as a switching control signal, to each selector 104 in the transmission system and each selector 112 in the reception system described later. The configuration of diversity control section 111 is described later.

Selectors 112 are provided for each subcarrier, and switched using as switching control an instruction from diversity control section 111 to output, for each subcarrier, the received signal from either of FFT processing section 109 for branch 1 or FFT processing section 110 for branch 2 to corresponding compensation section 113 (described below).

Compensation sections 113 are provided for each subcarrier, and perform compensation processing such as phase compensation on respective subcarrier received signals. P/S conversion section 114 rearranges each subcarrier signal for one chip, outputs at time t1 the first chip of a signal obtained by multiplexing spread transmitted signals 1 to n, outputs at time t2 the second chip of the signal obtained by multiplexing spread transmitted signals 1 to n, and then sequentially outputs at time tk the kth chip of the signal obtained by multiplexing spread transmitted signals 1 to n.

Despreading section 115 multiplies received signals, each of which is converted into the single-sequence signal, by respective spreading codes 1 to n, and obtains only signals spread with the codes to perform despreading.

The configuration of diversity control section 111 is next explained using FIG. 5. In FIG. 5, square sum calculation sections 201 are provided for each subcarrier for each branch, and calculate $\sqrt{(I^2+Q^2)}$ of the respective received signal to calculate a received amplitude. Comparison section 202 determines which branch provides the largest received amplitude, for each subcarrier, by comparing. The information indicative of either branch selected by the determination is output as the switching control signal to selectors 104 in the transmission system and selectors 112 in the reception system for each subcarrier.

The operation of the transmission/reception apparatus with the above-mentioned configuration is next explained.

In the transmission system, transmission signals 1 to n are spread with respective spreading codes 1 to n in spreading section 101, added to be single-sequence signals in addition section 102, and divided into subcarrier signals (1 to k) of which the number of is the same as that of spreading factor (herein, k) in S/P conversion section 103 for each chip.

In other words, when the spreading factor of each transmission signal is 16, a signal sequence comprised of the first chip of each spread transmission signal is carried with subcarrier 1, then sequentially subcarriers are assigned for respective chip positions in the transmission signals, and a signal sequence comprised of the 16th chip of each transmission signal is carried with subcarrier 16.

Each subcarrier transmission signal is output to either of IFFT processing section 105 or IFFT processing section 106 by selector 104 of which the switching is controlled by diversity control section 111, to be IFFT-processed, and then transmitted from antenna 107 (branch 1) or antenna 108 (branch 2).

Figure 6A:
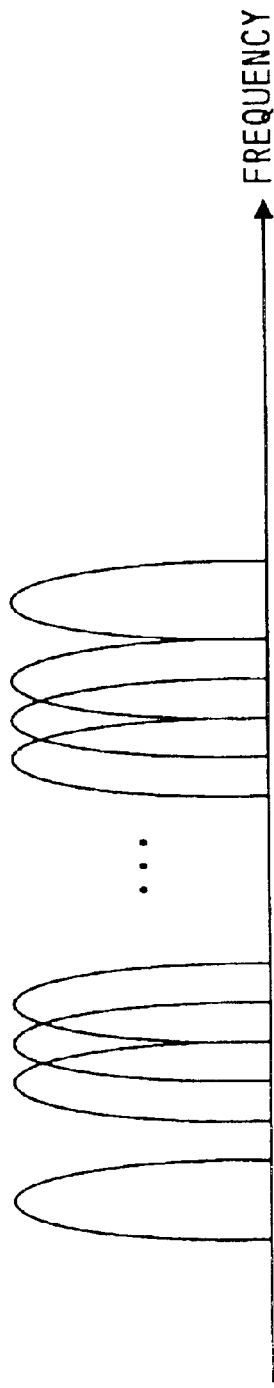
FIG. 6A is a schematic diagram illustrating one example of subcarrier assignments of transmission signals for branch 1 according to the first embodiment of the present invention.
Figure 6B:
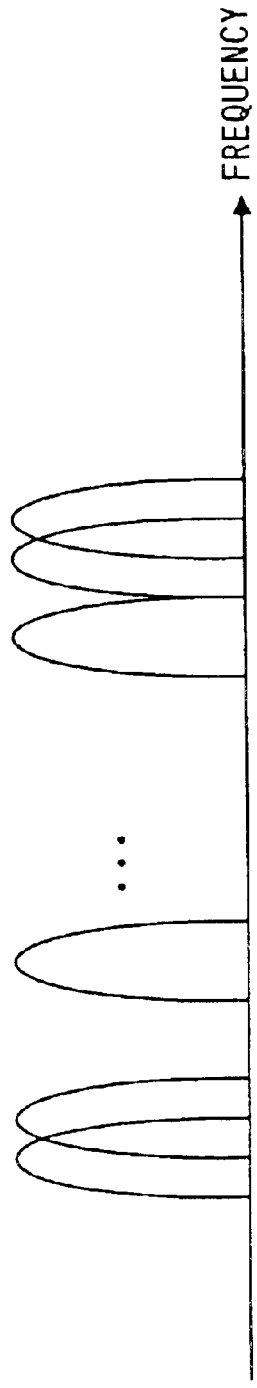
FIG. 6B is a schematic diagram illustrating one example of subcarrier assignments of transmission signals for branch 2 according to the first embodiment of the present invention.

Thus, in the transmission system, a signal is transmitted for each subcarrier through a branch that provides a larger received amplitude in the reception system. FIGS. 6A and 6B illustrates examples. FIG. 6A illustrates one example of subcarrier groups transmitted through branch 1, and FIG. 6B illustrates one example of subcarrier groups transmitted through branch 2.

As illustrated in the figures, since each subcarrier signal is transmitted through either branch, a reception side can obtain all the subcarrier signals by combining signals from both branches.

Meanwhile in the reception system, received signals received by antenna 107 (branch 1) and antenna 108 (branch 2) are respectively FFT-processed in FFT processing sections 109 and 110.

With respect to each received signal for each subcarrier in both branches, a received amplitude is calculated in diversity control section 111, and the amplitude level of the received signal from one branch is compared with that of the received signal from another branch to determine a larger level for each subcarrier. The branch selected for each subcarrier is output to selectors 104 in the transmission system and selectors 112 in the reception system.

Figure 6C:
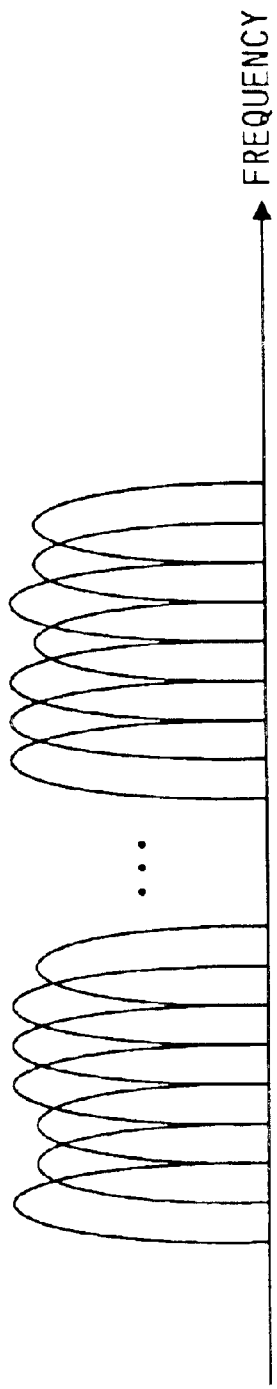
FIG. 6C is a schematic diagram illustrating one example of subcarrier assignments of received signals according to the first embodiment of the present invention.

FFT-processed received signals are selected by selectors 112 provided for each subcarrier, to output either signal of branch 1 or branch 2 providing a larger received amplitude for each subcarrier. This state is illustrated in FIG. 6C. For each subcarrier, in other words, for each frequency band, branch signals each with the larger received amplitude are selected, whereby it is possible to cancel subcarrier signals with extremely low levels.

Selected subcarrier received signals are compensated in, for example, phase rotations, in respective compensation sections 113, rearranged per chip basis in P/S conversion section 114 to be converted into single-sequence signals, despread with respective spreading codes in despreading section 115, and thereby received signals 1 to n are obtained.

Thus, according to this embodiment, by selecting a branch providing a larger received amplitude for each subcarrier at the time of reception, and transmitting only subcarrier signals selected for each branch at the time of transmission, the amplitude deviation in subcarrier received signals is decreased, and thereby it is possible to maintain the orthogonality between spreading codes, and to prevent the transmission efficiency from being lowered in the multipath environment.

(Second Embodiment)

A transmission/reception apparatus according to this embodiment has the similar configuration with that in the first embodiment, and performs transmission gain control.

Figure 7:
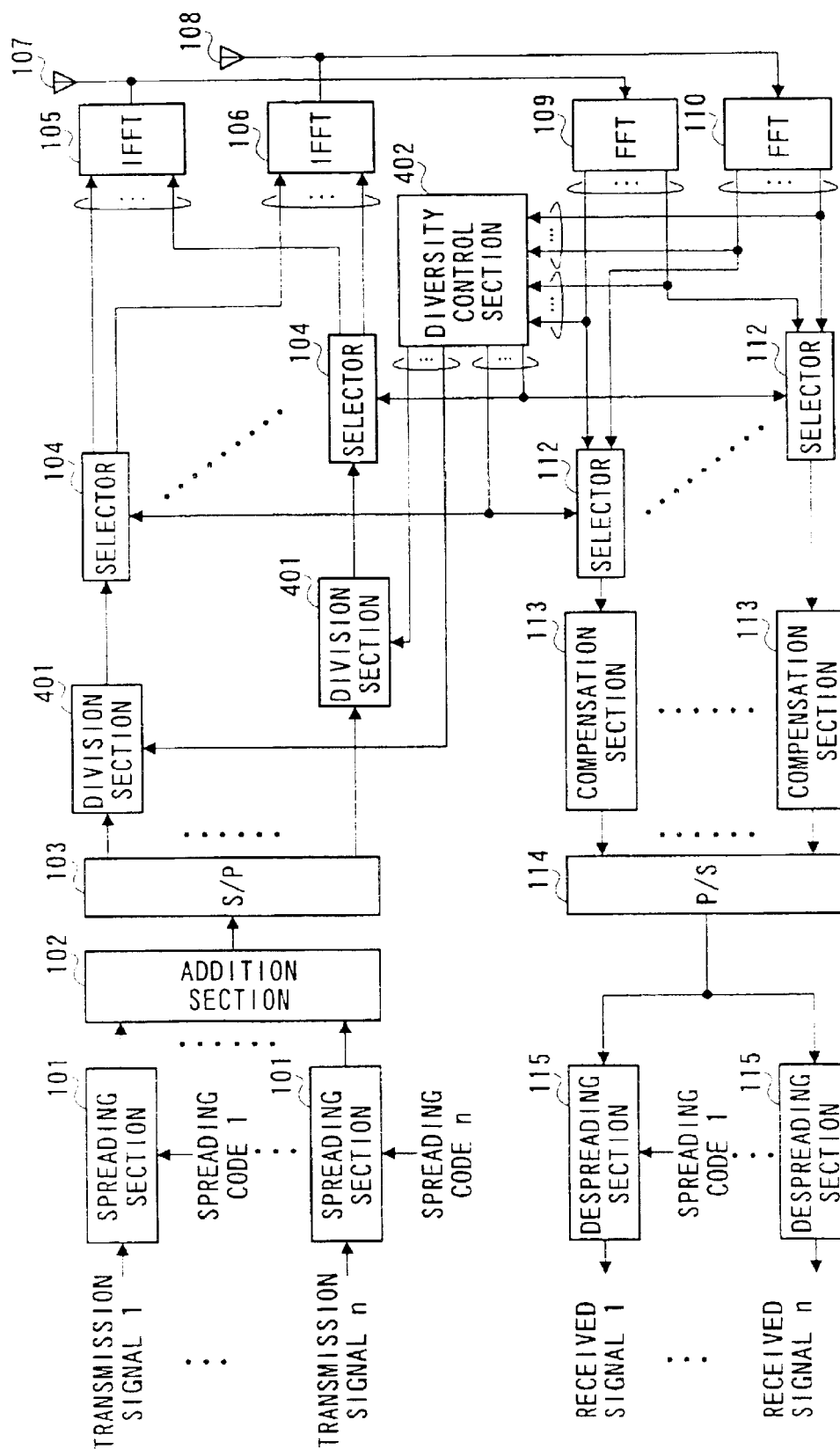
FIG. 7 is a block diagram illustrating a schematic configuration of a transmission/reception apparatus according to a second embodiment of the present invention.
Figure 8:
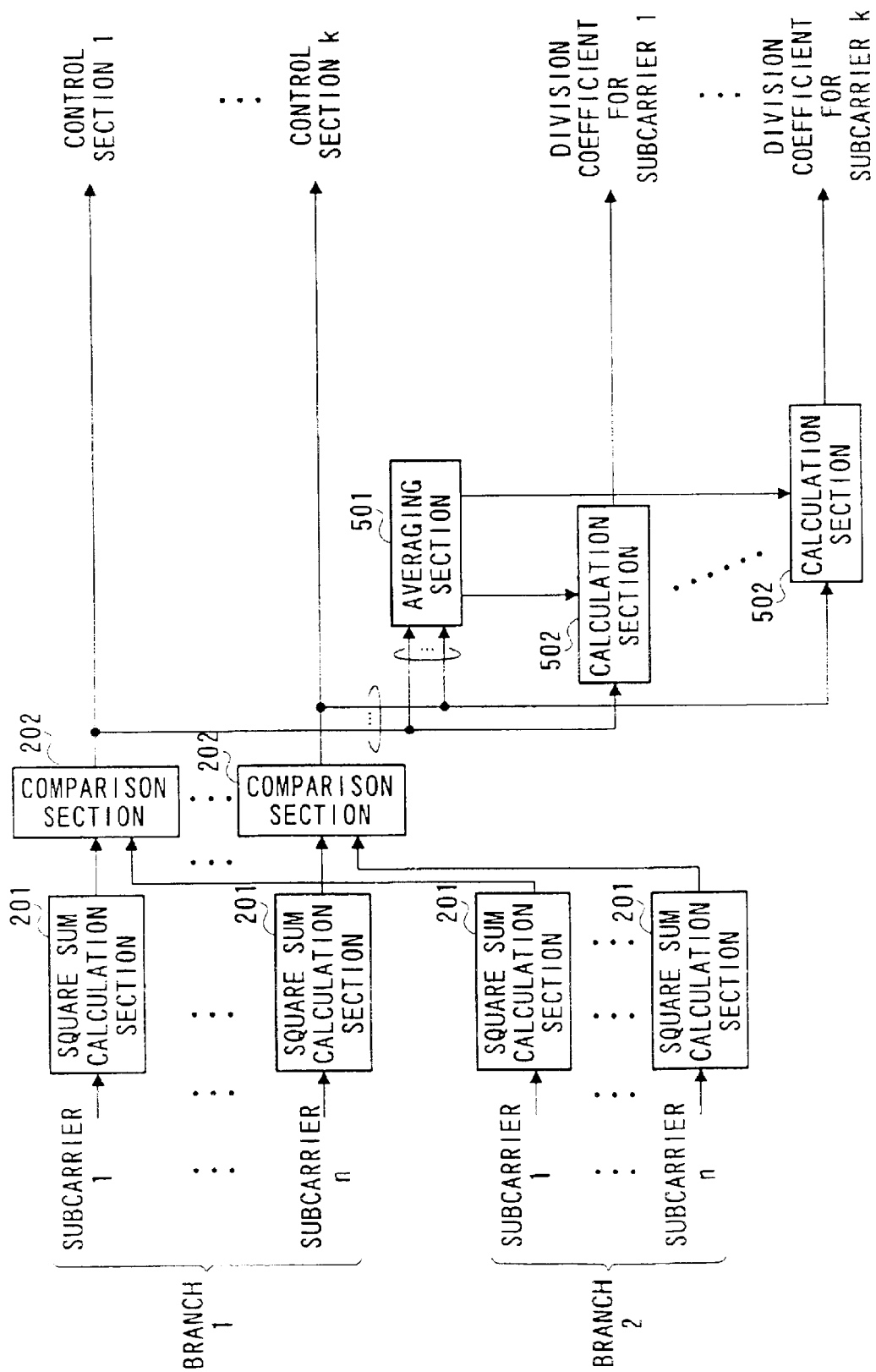
FIG. 8 is a block diagram illustrating a schematic configuration of a diversity control section in the transmission/reception apparatus according to the second embodiment of the present invention.

The transmission/reception apparatus according to this embodiment is explained below using FIGS. 7 to 9. FIG. 7 is a block diagram illustrating a schematic configuration of the transmission/reception apparatus according to the second embodiment of the present invention, FIG. 8 is a block diagram illustrating a schematic configuration of a diversity control section in the transmission/reception apparatus according to the second embodiment of the present invention, and FIG. 9 is a schematic diagram illustrating examples of subcarrier assignments of transmission signals and received signals according to the second embodiment of the present invention. In addition the same sections as in the first embodiments are given the same marks to omit specific explanations thereof.

In FIG. 7, divider 401 divides subcarrier signals by respective division coefficients set for each subcarrier corresponding to a received amplitude level of each subcarrier signal in the reception system to equal an amplitude level of each subcarrier signal.

Figure 9A:
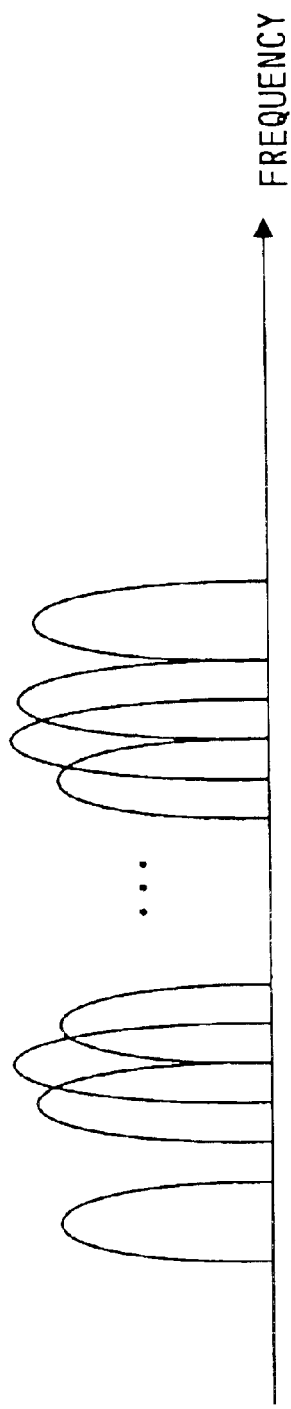
FIG. 9A is a schematic diagram illustrating one example of subcarrier assignments of transmission signals for branch 1 according to the second embodiment of the present invention.
Figure 9B:
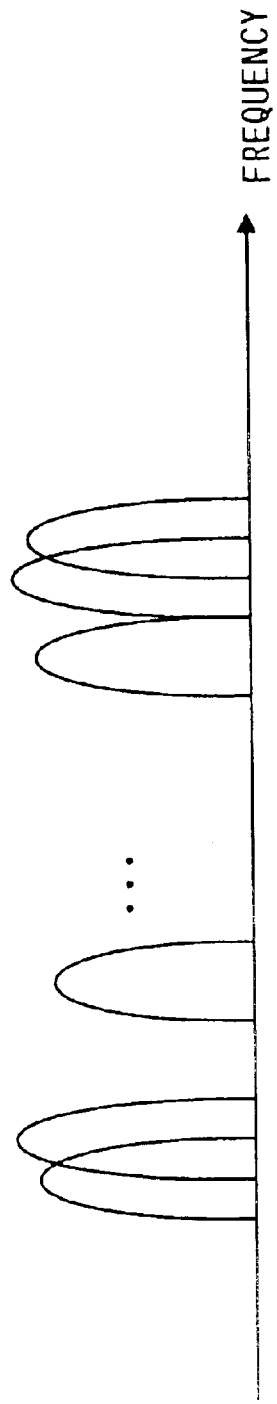
FIG. 9B is a schematic diagram illustrating one example of subcarrier assignments of transmission signals for branch 2 according to the second embodiment of the present invention.
Figure 9C:
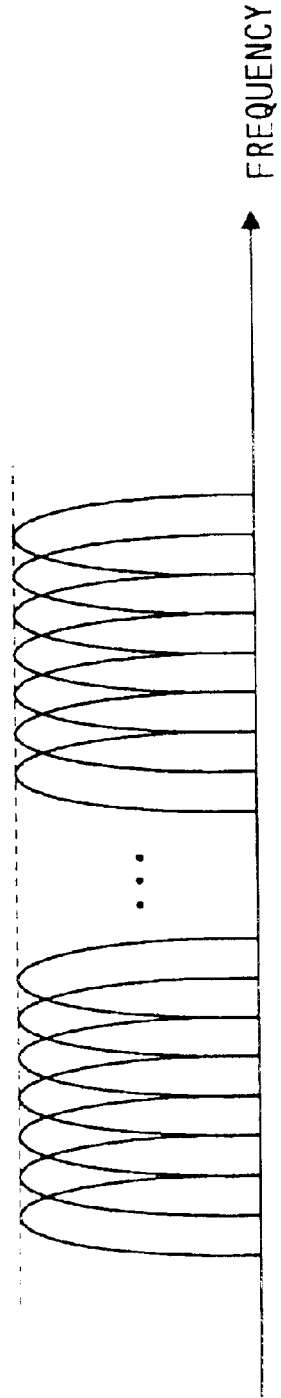
FIG. 9C is a schematic diagram illustrating one example of subcarrier assignments of received signals according to the second embodiment of the present invention.

When such transmission amplitude control taking propagation path into consideration is performed, transmission signals are weighted in advance for each subcarrier, and transmitted with amplitude levels illustrated in FIGS. 9A and 9B. FIG. 9A illustrates one example of subcarrier assignments of transmission signals to be transmitted from branch 1, and FIG. 9B illustrates one example of subcarrier assignments of transmission signals to be transmitted from branch 2.

Diversity control section 402 calculates an average amplitude level of the received signals from branches selected for each subcarrier, and further calculates a ratio of the received amplitude level to the average amplitude level for each subcarrier.

In FIG. 8, averaging section 501 calculates the average amplitude level of signals received from either branch selected in comparison section 202 for each subcarrier. Calculation section 502 calculates for each subcarrier the ratio of the amplitude level of the received signal selected for each subcarrier to the average amplitude level calculated in averaging section 501, and outputs the resultant as a division coefficient to respective divider 401.

In addition, the above-mentioned division coefficient W(k) is (output from square sum calculation section)/(output from averaging section 501), and expressed with the following equation 1, where Ik is a received I signal in subcarrier k, Qk is a received Q signal in subcarrier k, N is the number of all subcarriers, and k is the subcarrier number.

$$W(k) = \sqrt{\frac{I_k^2 + Q_k^2}{\frac{1}{N}\sum_{k=1}^{N}(I_k^2 + Q_k^2)}} \quad \text{eq. 1}$$

When the above-mentioned transmission amplitude control is performed, since the reception side receives signals that are weighted prior to the transmission corresponding to propagation path condition, received subcarrier amplitude levels are made constant as illustrated in FIF.9C, and thereby it is possible to cancel the amplitude deviation efficiently.

Thus according to this embodiment, the transmission amplitude control is performed for each subcarrier signal corresponding to the received amplitude, and weighting is performed prior to the transmission with propagation path condition taken into consideration, whereby it is possible to make amplitude levels constant levels at the reception side, and therefor to decrease the received amplitude deviation.

(Third Embodiment)

The transmission/reception apparatus according to this embodiment has the similar configuration with that in the second embodiment, and sets an upper limit in the amplitude level (gain) to reduce peak power.

Figure 10:
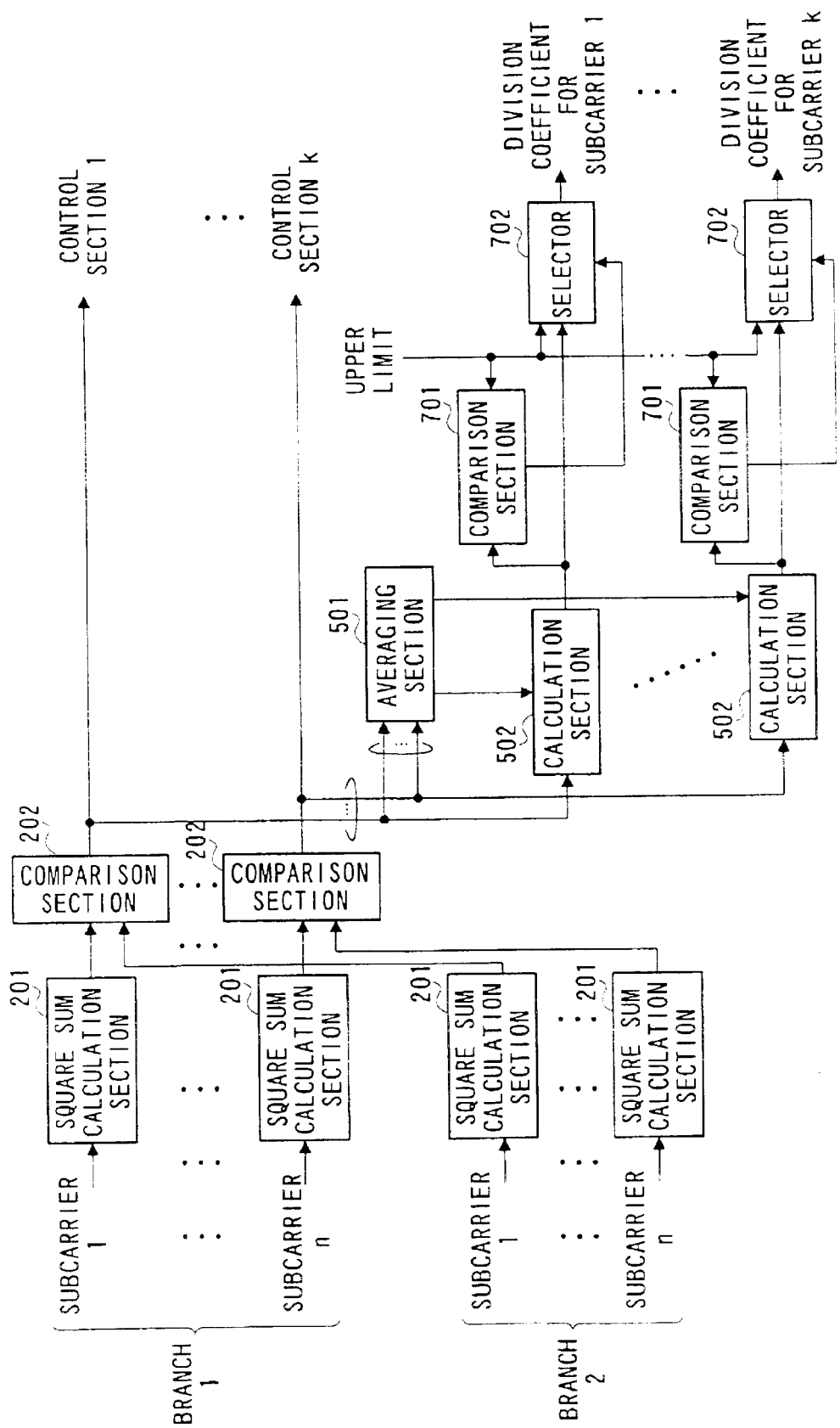
FIG. 10 is a block diagram illustrating a schematic configuration of a diversity control section in the transmission/reception apparatus according to a third embodiment of the present invention.

The transmission/reception apparatus according to this embodiment is explained below using FIG. 10. FIG. 10 is a partial block diagram illustrating a schematic configuration of a diversity control section in the transmission/reception apparatus according to the third embodiment of the present invention. In addition, the same sections as in the second embodiment are given the same marks to omit specific explanations thereof.

In FIG. 10, comparison sections 701 are provided for each subcarrier, compare respective division coefficients W(k) calculated in respective calculation sections 502 with the upper limit of amplitude that is a preset arbitrary number, and output respective comparison results to selector 702.

Each of selectors 702 switches between input sources using an output signal from respective comparison section 701 as a switching control signal to output the division coefficient itself when the division coefficient is equal to or less than the upper limit, and to output the upper limit when the division coefficient exceeds the upper limit.

Thus, according to this embodiment, the amplitude level is controlled not to exceed a predetermined upper limit, and it is thereby possible to reduce peak power.

In addition in this embodiment, it is possible to achieve both the peak power reduction and improved transmission efficiency by varying the upper limit of amplitude adaptively corresponding to the number of subcarriers.

While the above-mentioned first to third embodiments explain the case where the number of branches is two, the application of the present invention is not limited to this condition, and the number of branches maybe arbitrary. Further the numbers of subcarriers and spreading codes may be arbitrary also.

Moreover while the above-mentioned first to third embodiments explain the case of using selection diversity as a kind of diversity, the present invention is not limited to the above-mentioned condition, and is applicable to cases of using the other kinds of diversities such as equal-gain combining diversity and maximal-ratio combining diversity, and the same effects may be obtained.

In addition the transmission diversity explained in the above-mentioned first to third embodiments improves the error rate characteristic, but does not improve the transmission efficiency when used in an ordinary OFDM communication. That is due to the fact that in the ordinary OFDM communication in which one transmission signal is carried with one subcarrier, when two or more transmission signals are carried with one carrier, signals except desired signals provide interference in each subcarrier signal even if the received amplitude of each subcarrier is constant. Therefore the presence of interference signals with the same levels as desired signals makes communication difficult.

The transmission/reception apparatus according to the present invention adopts a configuration having a reception section that receives radio signals comprised of a plurality of carrier signals, subjected to frequency division multiplexing, from each of a plurality of branches, a branch selection section that calculates received amplitude levels for each subcarrier signal in all the branches, and detects a branch providing a largest received amplitude for each carrier signal, a demodulation section that despreads a selected carrier signal with a predetermined spreading code to obtain data, and a transmission section that performs frequency division multiplexing using the plurality of carrier signals to transmit for each subcarrier from the branch selected in the branch selection section.

According to this configuration, by selecting branches each providing a larger received amplitude for each subcarrier at the time of reception, and transmitting only subcarriers selected for each branch at the time of transmission, the amplitude deviation in subcarrier received signals is decreased, and thereby it is possible to maintain the orthogonality between spreading codes, and to prevent the transmission efficiency from being lowered in the multipath environment.

The transmission/reception apparatus according to the present invention adopts the configuration where the transmission section has an average level calculation section that calculates an average received amplitude level of selected carrier signals, a division coefficient calculation section that calculates a ratio of a received amplitude level of one of the selected subcarrier signals to the average received amplitude level for each carrier, and a division section that divides a transmission signal immediately before being subjected to the frequency division multiplexing by the ratio for each carrier signal.

According to this configuration, transmission amplitude control is performed for each subcarrier signal corresponding to the received amplitude, and weighting is performed prior to the transmission with propagation path condition taken into consideration, whereby it is possible to make amplitude levels constant levels at the reception side, and therefor to decrease the received amplitude deviation.

The transmission/reception apparatus according to the present invention adopts the configuration where the division coefficient calculation section holds an arbitrary threshold, compares a calculated ratio with the threshold, and outputs the threshold to the division section instead of the calculated ratio when the threshold is larger than the calculated ratio.

According to this configuration, since the amplitude level is controlled not to exceed the predetermined upper limit, it is possible to reduce the peak power.

The present invention is applicable to a communication terminal apparatus and base station apparatus in the digital radio communication system.

The transmission diversity is thereby performed in the OFDM-CDMA communication, then a branch providing the larger amplitude is selected for each subcarrier signal at the time of reception, and the selected subcarrier signals are only transmitted for each branch at the time of transmission. Therefore it is possible to decrease the amplitude difference between subcarrier signals, maintain the orthogonality between spreading codes, and improve the transmission efficiency in the multipath environment.

A transmission diversity method according to the present invention has the reception step of receiving radio signals comprised of a plurality of carrier signals, subjected to frequency division multiplexing, from each of a plurality of branches, calculating received amplitude levels for each carrier signal in all the branches, detecting a branch providing the largest received amplitude for each carrier signal, and despreading a received signal from a detected branch with a predetermined spreading code for each carrier signal to obtain data, and the transmission step of spreading a plurality of transmission data with respective different spreading codes, and performing the frequency division multiplexing using the plurality of carrier signals to transmit for each carrier from a selected branch.

According to this method, by selecting branches each providing a larger received amplitude for each subcarrier at the time of reception, and transmitting only subcarriers selected for each branch at the time of transmission, the amplitude deviation in subcarrler received signals is decreased, and thereby it is possible to maintain the orthogonality between spreading codes, and to prevent the transmission efficiency from being lowered in the multipath environment.

The transmission diversity method according to the present invention further has the steps of calculating an average received amplitude level of selected carrier signals, calculating a ratio of a received amplitude level of one of the selected carrier signals to the average received amplitude level for each carrier, and dividing a transmission signal immediately before being subjected to the frequency division multiplexing by the ratio for each subcarrier signal.

According to this method, transmission amplitude control is performed for each subcarrier signal corresponding to the received amplitude, and weighting is performed prior to the transmission with propagation path condition taken into consideration, whereby it is possible to make amplitude levels constant levels at the reception side, and therefor to decrease the received amplitude deviation.

The transmission diversity method according to the present invention further has the steps of holding an arbitrary threshold to compare a calculated ratio with the threshold, and dividing the transmission signal immediately before being subjected to the frequency division multiplexing by the threshold instead of the calculated ratio for each carrier signal when the threshold is larger than the calculated ratio.

According to this configuration, since the amplitude level is controlled not to exceed the preset upper limit, it is possible to reduce the peak power.

As explained above, according to the present invention, the transmission diversity is performed in the OFDM-CDMA communication, then a branch providing the larger amplitude level is selected for each subcarrier signal at the time of reception, the selected subcarrier signals are only transmitted for each branch at the time of transmission. Therefore it is possible to decrease the amplitude difference between subcarrier signals, maintain the orthogonality between spreading codes, and improve the transmission efficiency in the multipath environment.

The present invention is not limited to the above described embodiments, and various variations and modifications may be possible without departing from the scope of the present invention.

This application is based on the Japanese Patent Application No.HEI11-189520 filed on Jul. 2, 1999, entire content of which is expressly incorporated by reference herein.

What is claimed is:

1. A radio communication apparatus comprising:

a plurality of antennas;

a receiver that receives a radio signal comprising a plurality of subcarrier signals through said plurality of antennas, said plurality of subcarrier signals comprising a plurality of data that are spread over a frequency axis and that are code division multiplexed and frequency division multiplexed;

a detector that, on a per subcarrier basis and on a per antenna basis, detects an amplitude level of said radio signal received through said plurality of antennas;

a selector that, on a per subcarrier basis, makes a comparison of the detected amplitude levels between said plurality of antennas and selects one of said antennas through which said radio signal gains a largest amplitude level; and a despreader that, on a per subcarrier basis, despreads said radio signal received through the selected antenna with a predetermined spreading code and obtains said plurality of data multiplexed upon said plurality of subcarrier signals.

2. The radio communication apparatus according to claim 1, further comprising:

a spreader that spreads a plurality of data over a frequency axis with different spreading codes to produce spread data;

a first multiplexer that code division multiplexes the spread data to produce code division multiplexed data;

a divider that divides the code division multiplexed data on a per chip basis to produce data divided on a per chip basis;

a second multiplexer that assigns the data divided on a per chip basis to respective transmit subcarrier signals and frequency division multiplexes said data divided on a per chip basis to produce frequency division multiplexed data; and a transmitter that transmits a transmit radio signal through said plurality of antennas, said transmit radio signal comprising said frequency division multiplexed data, wherein:

said second multiplexer assigns said data divided on a per chip basis to said transmit subcarrier signal transmitted through the antenna selected by said selector.

3. The radio communication apparatus according to claim 2, further comprising:

a calculator that, on a per subcarrier basis, calculates a ratio between an amplitude level of a subcarrier signal received through said antenna selected by said selector and an average value of amplitude levels of said subcarrier signals; and a mathematical divider that, on a per subcarrier basis, divides the data divided on a per chip basis by said ratio.

4. The radio communication apparatus according to claim 3, further comprising a comparator that, in accordance with a comparison result between the ratio calculated by said calculator and a threshold level, outputs the ratio to said mathematical divider when said ratio is below or equal to said threshold level, and outputs said threshold level to said mathematical divider when said ratio is above said threshold level.

5. A communication terminal apparatus comprising the radio communication apparatus of claim 1.

6. A base station apparatus comprising the radio communication apparatus of claim 1.

7. A radio communication method comprising the steps of:

receiving a radio signal comprising a plurality of subcarrier signals through a plurality of antennas, said plurality of subcarrier signals comprising a plurality of data that are spread over a frequency axis and that are code division multiplexed and frequency division multiplexed;

detecting, on a per subearrier basis, an amplitude level of said radio signal received through said plurality of antennas to produce detected amplitude levels between said plurality of antennas;

comparing, on a per subcarrier basis, the detected amplitude levels and selecting one of said antennas through which said radio signal gains a largest amplitude level; and despreading, on a per subcarrier basis, said radio signal received through the selected antenna with a predetermined spreading code and obtaining said plurality of data multiplexed upon said plurality of subcarrier signals.

* * * * *